Figure 1:
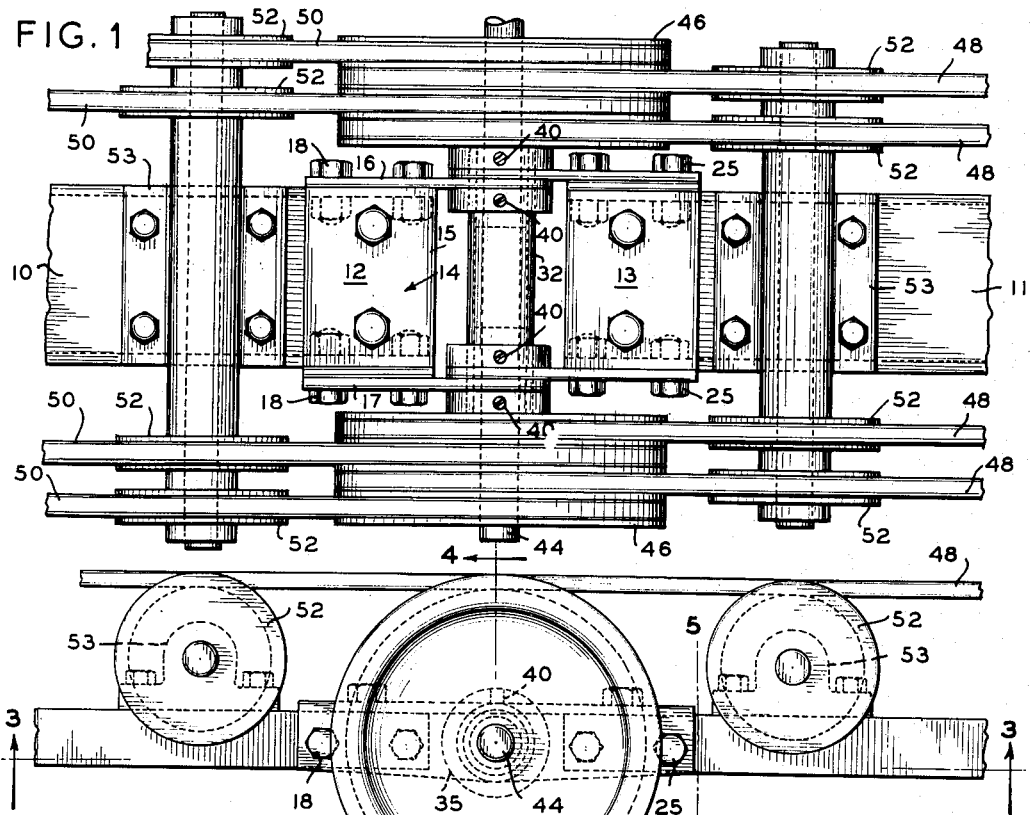

Oct. 4, 1955   G. A. SCHLEGEL   2,719,625
ADJUSTABLE CONVEYOR
Filed Oct. 23, 1953   2 Sheets-Sheet 1

INVENTOR
GLEN A. SCHLEGEL
BY A. Yates Dowell
ATTORNEY

Oct. 4, 1955　　　G. A. SCHLEGEL　　　2,719,625
ADJUSTABLE CONVEYOR
Filed Oct. 23, 1953　　　　　　　　　　　　　　　2 Sheets-Sheet 2
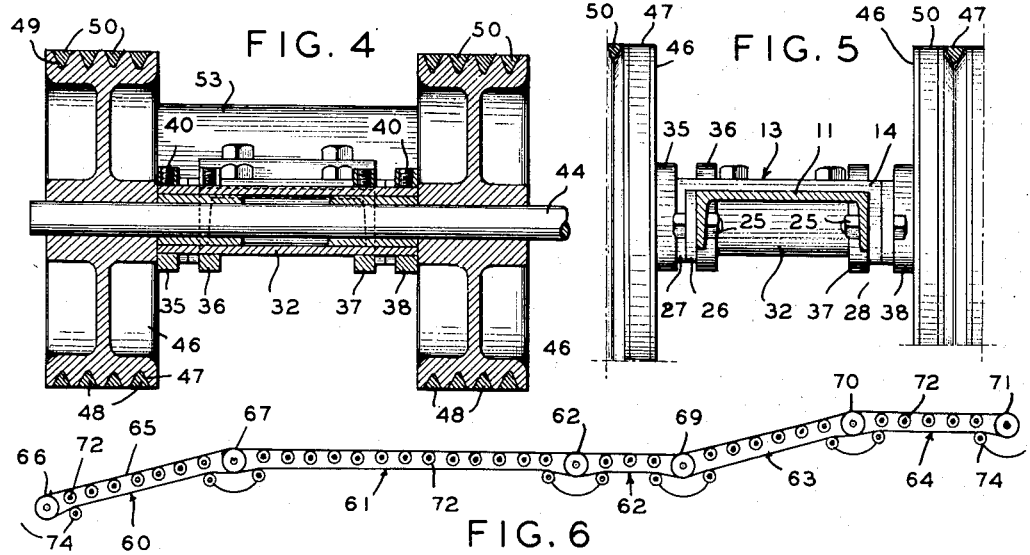
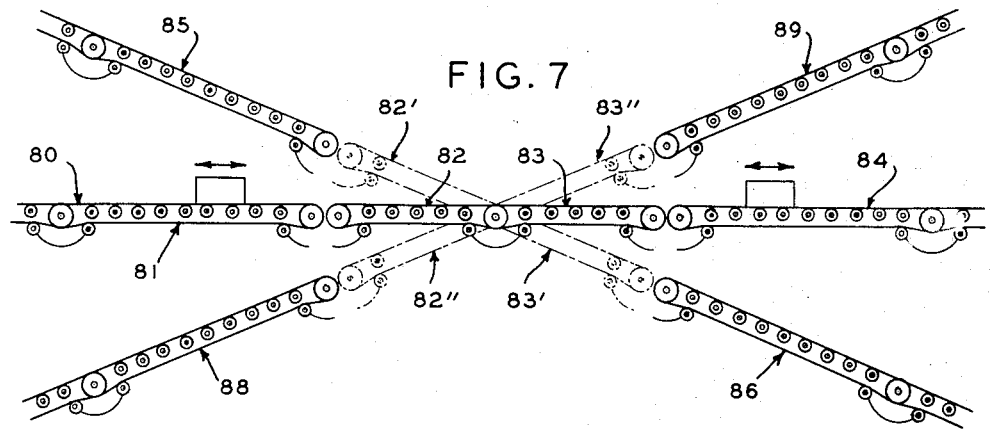
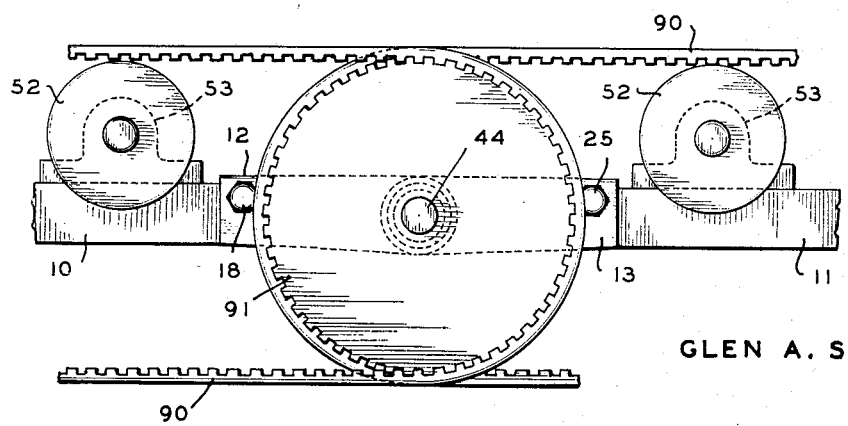
INVENTOR
GLEN A. SCHLEGEL
BY *A. Yates Dowell*
ATTORNEY

United States Patent Office 2,719,625
Patented Oct. 4, 1955

2,719,625

ADJUSTABLE CONVEYOR

Glen A. Schlegel, Halethorpe, Md.

Application October 23, 1953, Serial No. 387,869

9 Claims. (Cl. 198—88)

This invention relates to materials handling equipment and more particularly to an endless belt conveyor which is adapted for moving materials on either a continuous level or incline, or from one incline to another, the sections of the conveyor being easily adjustable for operation at various angles of incline.

Heretofore power driven belt conveyors have usually employed a flat belt of substantial width which is carried on a series of rollers, the ends of the belt being laced together and the belts operating within a frame. In order to remove the belt it has been necessary to unlace its ends since the belt cannot be slipped off the side of the frame. In the use of such flat belts, difficulty is experienced in keeping the belt at the proper tension across its entire width and in keeping it properly tracked on the rollers. Both conical and flat rollers are in use but neither is completely satisfactory. Where a conventional flat belt is properly adjusted to run in one direction, difficulty is experienced in reversing direction. Where a change in the degree of incline of a conventional flat belt occurs various space consuming arrangements of rollers and tension devices are employed for keeping the proper tension on the belt and for assuring continuity of movement of the load. Furthermore, it is necessary to employ at least a pair of rollers to support the belt adjacent to the change of incline. This results in the transfer from one line of movement to the other being less smooth than if only a single roller were employed.

Chain conveyors are also in common use but these are undesirable for the movement of certain materials because of the transfer of the lubricant from the chains to such materials. Furthermore, the necessity for constantly lubricating the links of a chain conveyor frequently renders their use undesirable.

Accordingly, it is an object of the present invention to provide a belt conveyor which is easily adjustable for various angles of incline without the necessity of employing space consuming belt tensioners and the like adjacent to the apex of the incline.

A further object is the provision of a belt conveyor in which the belts may be removed from the rollers without taking the belt apart or dismantling any of the belt carrying members.

A further object is the provision of a belt conveyor which is easily and quickly adjustable for operation at various angles of incline and which affords smooth transfer of material across the apex of the angle.

A further object is to provide a belt conveyor which is relatively simple and inexpensive to produce and use and which is self-tracking without the use of additional tracking devices.

A further object is the provision of a system of belt conveyors by means of which material flowing on a specified level or incline may be moved to one or more different levels, and selectively, at the same or a different incline with a minimum amount of expenditure of time and effort in effecting the changeover.

Figure 2:
Figure 3:
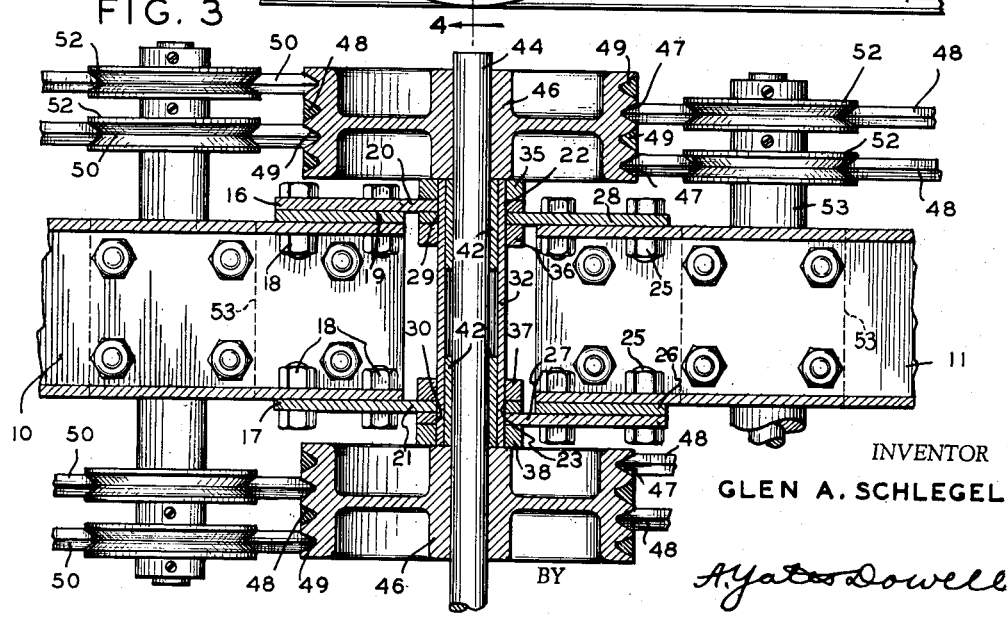

These and other objects of the invention will become apparent from the following description, in conjunction with the accompanying drawings in which:

Fig. 1 is a plan view of the end portions of a pair of frame members of a conveyor and illustrating the connection therebetween and the mounting of the belts thereon;

Fig. 2, a side elevation of the device of Fig. 1;

Fig. 3, a section on the line 3—3 of Fig. 2;

Fig. 4, a section on the line 4—4 of Fig. 2;

Fig. 5, a section on the line 5—5 of Fig. 2;

Fig. 6, a schematic diagram illustrating a conveyor embodying the invention and having a plurality of connected sections;

Fig. 7, a schematic diagram illustrating a system of independent conveyor sections on different levels; and Fig. 8, a view similar to Fig. 2 illustrating the use of a timing belt in the present invention.

Briefly stated, the conveyor includes one or more sections, each having an elongated frame member on which are mounted one or more sheaves on either side thereof and at each end. Spaced idler sheaves are provided between the ends to carry the weight of the belts operating on the sheaves. In order to permit adjacent sections to operate at an angle of incline with respect to each other, connectors are attached to the ends of adjacent frame members and have overlapping extensions in which a drive shaft for the sheaves is mounted, the frame members being rotatable with respect to each other and with respect to the drive shaft. As a result angular movement of the frame members does not require adjustment of the belts nor interfere with continuity of movement from the belts on one frame member to those on another. Since the belts are mounted on sheaves externally of the frame the belts may be easily removed without separating the ends of the belt or dismantling the frames.

Referring to the drawings, there is illustrated the adjacent ends of a pair of conveyor sections having elongated frame members 10 and 11. Although the frame members are illustrated as being of channel section, various sections may obviously be employed. Attached to the adjacent ends of the frame members are connectors 12 and 13, the connectors preferably being substantial duplicates of each other.

Connector member 12 has a channel body section 14 including a web 15 and side members 16 and 17, the body section engaging the end of the frame member 10 and being secured thereto by suitable fastening means 18 passing through the sides and web thereof. Spacer 19 is positioned between the side member 16 and the frame member 10 for purposes which will become apparent. Extending from the side members of the channel section are connector arms or extensions 20, 21 which have apertures on bores 22, 23, respectively, therethrough.

Similarly, the connector 13 is attached to the frame member 11 by fastening means 25. Spacer 26 is positioned between the side of the connector and the frame on the opposite side from that of the spacer 19. Connector arms 27, 28 extend from connector 13 adjacent to the connector arms 20, 21 from the connector member 12, and are staggered with relation thereto, the arms 27, 28 having apertures 29, 30 for receiving the shaft and bearing elements which pass through the apertures 22, 23 in the connector arms 20, 21.

A tubular shaft or sleeve 32 extends through the aligned apertures in the connector arms. Collars 35 and 36 are mounted on the sleeve on either side of the arms 20, 28. Similarly, collars 37, 38 are mounted on the sleeve on either side of the arms 21, 27. Fastening means or set screws 40 extend through the collars into engagement with the sleeve in order to maintain the position of the collars on the sleeves, thus positioning the connector arms thereon.

Bearings 42 are provided within the sleeve 32 and at either end thereof within which a main drive shaft 44 is rotatably mounted. The drive shaft has keyed to it at each end of the sleeve 32 sheave members 46 which, in the illustrated embodiments, have grooves 47 for a pair of V-belts 48 operating along the frame member 11, and grooves 49 for a pair of V-belts 50 along the frame member 10.

In order to support the belts along the frame members, idler sheaves 52 are mounted on suitable bearings 53 at spaced intervals along the frame members 10 and 11. Suitable belt tensioning devices of conventional construction may also be employed.

The conveyor may be made up of any number of sections desired, each section being of an appropriate length. At each end of each section a connector is attached as previously described and receives a tubular shaft or sleeve within which a shaft is rotatably mounted, a sheave being attached to the shaft on either side of the frame. Two sections may be joined together, end-to-end, as previously described, or a connector at one end of a section may be used to support a shaft for sheaves without being joined to another section at that end.

As illustrative of a conveyor formed of a number of sections, Fig. 6 discloses a conveyor comprised of sections 60, 61, 62, 63 and 64 of various lengths. A belt 65 is carried on main sheaves 66, 67, 68, 69, 70 and 71 and on idler sheaves 72 which are mounted on the frame at spaced intervals between the main sheaves. One or more of the main sheaves may be driven as required. Tensioning rollers 74 are applied to the belt on the under side of the frame in accordance with conventional practice. With conventional conveyors it would be necessary to have an aligned pair of spaced sheaves or rollers for changing a belt length from one angle of incline to another, such as those occurring in Fig. 6 at the main sheaves 67, 69 or 70. With the present invention, a single sheave is employed for each belt length at the apex of each angle and effects a smooth transfer from one line of travel to another.

Fig. 7 further illustrates the flexibility of use of a conveyor in accordance with the present invention. In Fig. 7, a middle conveyor line 80 is disclosed which has a first section 81, second and third connected sections 82 and 83, and a fourth section 84. On an upper level or floor a section 85 is disposed at an angle above section 81 and may be easily connected to the lower level conveyor section 86 by turning the sections 82 and 83 from the full line position to the phantom position indicated at 82' and 83'. Similarly, a conveyor section 88 disposed below section 81 on the lower level may be connected to section 89 with its upper end on the upper level by means of the sections 82 and 83 when in the position indicated in phantom by the numeral 82", 83".

With the use of the foregoing system goods may be moved from any level to the same or any other level by merely positioning the sections 82 and 83 as required. For example, goods may be moved from the lower level on conveyor 88 onto the conveyor 82, in the position 82", and from there to conveyor 84, or 89, on the upper levels by means of the conveyor section 83, in the full line position, or in the phantom position 83".

In addition to the foregoing examples of uses for the conveyor system, other ways of using the device may be employed, these being practically unlimited. For example, the conveyor may easily be broken intermediate its length and a section lifted out of the way in order to permit traffic to cross the conveyor line. Referring to Fig. 6 for illustrative purposes, the section 62 may be released from the main sheave 69 and pivoted around the shaft of sheave 68 to a vertical position in order to permit traffic to cross the gap between the main sheaves 68 and 69. Similarly, a horizontal section of the conveyor may be raised or lowered to form an arch or subway in order to permit the continuous flow of materials both ways across an intersection. A further example is that a section of a conveyor line, operating at one level directly above or below another line, may be removed from its line and inclined to the other and used to convey materials from its main line to the other.

Although a particular type of belt has been illustrated and described, the invention is not limited to this particular type, but includes others as well. For example, Fig. 8 discloses the use of a timing belt 90 operating on a timing belt sheave or roller 91.

Accordingly, it will be understood that the invention includes the provision of a conveyor of one or more elongated sections having a connector at each end, the connectors each being adapted to coact with a connector extending from the adjacent end of an adjoining section to receive a hollow shaft relative to which the connectors are rotatable, the shaft having a main shaft rotatably mounted therein for carrying a sheave or other belt supporting means on the sides of the frame. Since the sheaves are mounted externally of the frame, the belts may be easily positioned on the sheaves and removed. Furthermore, the sections may be disposed at various degrees of angularity with respect to each other without varying the tensions on the belts, and without requiring the use of additional rollers or other belt direction changing devices, while at the same time providing for the smooth flow of goods from one angle of incline to another.

It will be understood by those skilled in the art that the invention is not limited to the specific embodiments disclosed but that various modifications and substitutions are within its scope and therefore it is only limited as found in the following claims.

What is claimed is:

1. In a conveyor, a pair of elongated frame members arranged in end-to-end relation and with their adjacent ends in spaced relation, a connector member for each of the adjacent ends, said connector members each having a body portion attached to an end of a frame member and a pair of spaced connector arms extending beyond the end of the frame member and in substantial alignment therewith, the connector arms from one end extending into overlapping relation with those of the adjacent end, the connector arms having aligned apertures therethrough, a tubular shaft rotatably mounted in said apertures and extending through said connector arms, bearing means in said tubular shaft, a main drive shaft rotatably mounted in said bearing means and extending beyond said connector arms on either side of said frame members, and sheave means mounted on the drive shaft on each side of said frame members for receiving endless belt means.

2. In a conveyor, a pair of elongated frame members arranged in end-to-end relation and with their adjacent ends in spaced relation, a connector member attached to each of the adjacent ends, said connector members each having a pair of spaced arms extending beyond the end of the frame member, the arms from one connector member extending into overlapping relation with those of the adjacent connector member, the arms having aligned apertures therethrough, a tubular shaft rotatably mounted in said apertures and extending through said arms, a main drive shaft rotatably mounted in said tubular shaft and extending beyond said arms on either side of said frame members, and sheave means mounted on the drive shaft on each side of said frame members for receiving endless belt means.

3. In a conveyor, a pair of elongated frame members arranged in end-to-end relation and with their adjacent ends in spaced relation, a connector member attached to each of the adjacent ends, said connector members having extension means extending beyond the end of the frame member, the extension means from one connector member extending into proximity to those of the adjacent connector member, a tubular shaft rotatably received in the extension means and transversely of the frame members, a main drive shaft rotatably mounted in said tubular shaft and extending therebeyond on either side of said frame members, and sheave means mounted on the drive shaft on each side of said frame members for receiving endless belt means.

4. The structure of claim 3 further comprising means preventing axial movement of said tubular shaft relative to said extension means.

5. The structure of claim 3, the extension means from one connector member extending into overlapping relation with those of the adjacent connector member.

6. The structure of claim 3, the sheave means comprising V-belt sheaves.

7. The structure of claim 3, the sheave means comprising timing belt sheaves.

8. A conveyor comprising a plurality of elongated frame members arranged in end-to-end relation and with the adjacent ends in spaced relation, a connector member attached to each of the adjacent ends, said connector members having extension means extending beyond the end of the frame, the extension means from one connector member extending into proximity to those of the adjacent connector member, a tubular shaft rotatably received in the extension means and transversely of the frame members, a main drive shaft rotatably mounted in said tubular shaft and extending therebeyond on either side of said frame members, and sheave means mounted on the drive shaft on each side of said frame members for receiving endless belt means.

9. A conveyor comprising a pair of elongated frame members arranged in end-to-end relation and with their adjacent ends in spaced relation, a connector member at each of the adjacent ends, said connector members each having extension means extending beyond the end of the frame member, the extension means from one connector member extending into proximity to the extension means of the adjacent connector member, a drive shaft rotatably received by the said extension means from the connector members, said drive shaft being positioned transversely of the frame members and extending therebeyond on either side of said frame members, sheave means mounted on the drive shaft on each side of said frame members for receiving endless belt means, shaft means rotatably mounted at the other ends of the frame members and positioned transversely thereof and extending on either side of said frame members, and endless belt means for each frame member and running on the sheave means longitudinally thereof.

References Cited in the file of this patent

UNITED STATES PATENTS

| | | |
|---|---|---|
| 357,145 | Dodge | Feb. 1, 1887 |
| 758,739 | Culp | May 3, 1904 |
| 791,653 | Rouze | June 6, 1905 |
| 823,780 | Hodgson | June 19, 1906 |
| 1,402,787 | Norris | Jan. 10, 1922 |
| 1,860,679 | Lockhart | May 31, 1932 |
| 2,490,381 | Shields | Dec. 6, 1949 |
| 2,679,919 | Koning | June 1, 1954 |

FOREIGN PATENTS

| | | |
|---|---|---|
| 56,636 | Sweden | Mar. 27, 1918 |
| 214,173 | Great Britain | Apr. 17, 1924 |